Patented July 9, 1940

2,206,911

UNITED STATES PATENT OFFICE 2,206,911

AZO COMPOUNDS

James G. McNally and Joseph B. Dickey, Rochester, N. Y., assignors to Eastman Kodak Company, Rochester, N. Y., a corporation of New Jersey No Drawing. Application November 27, 1937, Serial No. 176,890

16 Claims. (Cl. 260—205)

This invention relates to aromatic azo dye compounds. More particularly, it relates to nuclear non-sulfonated aromatic azo dye compounds suitable for the coloration of organic derivatives of cellulose. The invention includes the azo dye compounds, the process for their preparation, the process of coloring with them and materials colored with the azo dye compounds of the invention.

Organic derivatives of cellulose are characterized by an indifferent affinity for the usual cotton or wool dyes, especially the ordinary water-soluble dyes. Typical organic derivatives of cellulose include the hydrolyzed as well as the unhydrolyzed cellulose organic acid esters, such as cellulose acetate, cellulose formate, cellulose propionate or cellulose butyrate, and the hydrolyzed as well as the unhydrolyzed mixed organic acid esters of cellulose, such as cellulose acetate-propionate, cellulose acetate-butyrate, and the cellulose ethers, such as methyl cellulose, ethyl cellulose or benzyl cellulose.

The aromatic azo dye compounds of our invention, broadly speaking, consist of azo compounds of a phenyl alkyl ketone, the phenyl nucleus of which contains two substituents selected from the group consisting of a univalent aliphatic radical, a nitro group and a halogen atom. These compounds may be prepared by diazotizing such a disubstituted phenyl alkyl ketone amine and coupling with an aryl, hydroaromatic or heterocyclic coupling component.

While the azo dye compounds of our invention relate broadly to azo dye compounds of the disubstituted phenyl alkyl ketones above defined, they relate more particularly to the azo dye compounds obtained by diazotizing a phenyl alkyl ketone amine having the formula:

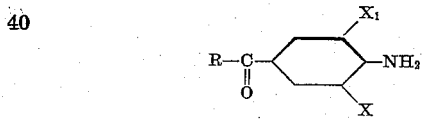

wherein R represents an alkyl group and X and $X_1$ each represent a univalent aliphatic radical such as an alkyl group, an alkoxy group or an alkoxyhydroxy group, a nitro group and a halogen atom such as chlorine, bromine, fluorine or iodine and coupling with an aryl, hydroaromatic or heterocyclic coupling component. Advantageously R is a methyl group.

The dye compounds obtained by the above described coupling reaction may be represented by the formula:

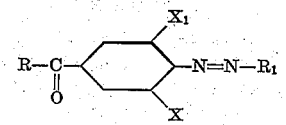

wherein R, X and $X_1$ have the meaning above given and $R_1$ is an aryl, hydroaromatic or heterocyclic coupling component.

$R_1$ may be an aryl coupling component of the benzene or naphthalene series, a hydroaromatic coupling component such as 1,3-cyclohexadione or one derived from a 1,3-cyclohexadione, 5-methyl-1,3-cyclohexadione, 5,5-dimethyl-1,3-cyclohexadione and 5-phenyl-1,3-cyclohexadione, for example, and a heterocyclic coupling component such a barbituric acid, thiobarbituric acid and compounds derived from these two substances, and a pyrazolone compound such as 1-phenyl-3-methyl-5-pyrazolone. Advantageously, $R_1$ is an aryl nucleus of the benzene series.

The nuclear non-sulfonated azo dye compounds of our invention constitute a valuable class of dyes suitable for the dyeing or coloration of material made of or containing an organic derivative of cellulose. The dyeings produced employing said non-sulfonated azo dye compounds are, in general, of good fastness to light and washing and range in shade from yellow to purplish-blue. The nuclear sulfonated azo dye compounds of our invention possess little or no practical utility for the dyeing of organic derivatives of cellulose but may be used for the dyeing of such materials as cotton or wool, for example, being applied thereto by the customary methods of application. These nuclear sulfonated dye compounds may be prepared by sulfonation of the nuclear non-sulfonated compounds in known fashion or by the use of suitable previously sulfonated substituents.

The following examples illustrate the preparation of the compounds of our invention:

Example 1

37.5 grams of 1-aceto-3,5-diiodo-4-aminobenzene are suspended in 200 cc. of water to which 30 cc. of 36% hydrochloric acid has been added. The resulting solution is cooled to a temperature approximating 0–5° C. and diazotized by adding, with stirring, 6.9 grams of sodium nitrite dissolved in water.

14 grams of 5,5-dimethyl-1,3-cyclohexadione are dissolved in 200 cc. of water containing 31.8 grams of sodium carbonate. The resulting solution is cooled to a temperature approximating 0–10° C. and the diazo solution prepared as described above is slowly added with stirring. Upon completion of the coupling reaction which is carried out at a temperature of about 0–10° C., the mixture is made acid to litmus by the addition of acetic acid following which the dye compound is recovered by filtration, washed with water and dried. The dye compound formed has the formula:

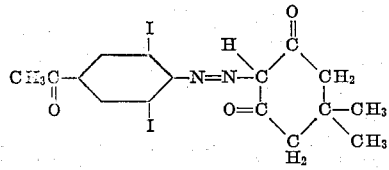

and colors cellulose acetate silk greenish-yellow from an aqueous suspension.

Example 2

17.5 grams of ethyl-β-hydroxyethylaniline are dissolved in 100 cc. of glacial acetic acid. The resulting solution is cooled to a temperature approximating 0–10° C. and the diazo solution prepared as in Example 1 is added with stirring. The coupling reaction which occurs is carried out while maintaining a temperature of 0–10° C. Following the complete addition of the diazo solution, the mixture is allowed to stand for fifteen minutes and is then made neutral to Congo red paper by the addition of sodium acetate. Upon completion of the coupling reaction, the dye compound formed is precipitated by the addition of water, recovered by filtration, washed and dried. The dye compound formed has the formula:

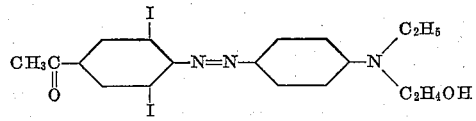

and colors cellulose acetate silk a red shade from an aqueous suspension.

Example 3

25.9 grams of 1-aceto-3-nitro-5-bromo-4-aminobenzene are added to 200 cc. of water to which 30 cc. of 36% hydrochloric acid has been added and the resulting mixture is diazotized at a temperature approximating 0–5° C. by the addition, with stirring, of 6.9 grams of sodium nitrite dissolved in water.

10.8 grams of p-cresol are dissolved in 100 cc. of water containing 10 grams of sodium hydroxide. The solution resulting is cooled to a temperature approximating 0–10° C. by the addition of ice and the diazo solution prepared above is added with stirring. The coupling reaction which takes place is carried out at a temperature of 0–10° C. and upon its completion the mixture is made acid to litmus by the addition of acetic or hydrochloric acid, for example. The dye compound formed is recovered by filtration, washed with water and dried. It has the formula:

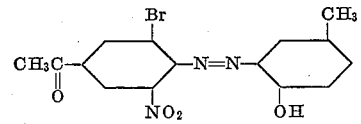

and colors cellulose acetate silk a yellow shade from an aqueous suspension.

Example 4

26.9 grams of di-γ-hydroxypropyl-α-naphthylamine are dissolved in 200 cc. of glacial acetic acid and the resulting solution is cooled to a temperature approximating 0–10° C. The diazo solution prepared in Example 3 is then added with stirring and a temperature of 0–10° C. is maintained throughout its addition. The mixture is then allowed to stand for 15 minutes following which it is made neutral to Congo red paper by the addition of sodium acetate. Upon completion of the coupling reaction, the dye compound formed is precipitated by the addition of water, recovered by filtration, washed with water and dried. The dye compound formed has the formula:

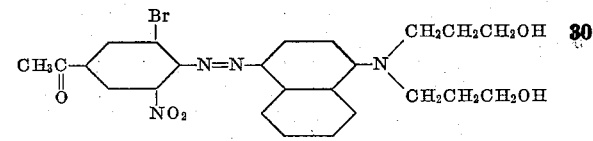

and colors cellulose acetate silk a wine color from an aqueous suspension.

Example 5

(A) 7.6 grams of powdered sodium nitrite are dissolved in 53 cc. (97.5 gm.) of cold concentrated sulfuric acid. After the addition, the solution is warmed to a temperature not exceeding 70° C. following which it is cooled to a temperature of 10–15° C.

(B) 22.5 grams of 1-aceto-3,5-dinitro-4-aminobenzene are dissolved in 220 cc. of hot glacial acetic acid and following solution of the 1-aceto-3,5-dinitro-4-aminobenzene, the hot acetic acid solution is cooled rapidly to room temperature.

The mixture prepared in B is added to solution A over a period of 30 minutes while maintaining a temperature of 10–15° C. Following this addition, the resulting solution is stirred for one hour or more and then one gram of urea is added to remove any excess nitrous acid.

The diazo solution thus prepared is added with stirring to 20.9 grams of di-γ-hydroxypropyl aniline dissolved in 100 cc. of glacial acetic acid. This addition is effected while maintaining a temperature approximating 0–10° C. The mixture is then allowed to stand for 15 minutes following which it is made neutral to Congo red paper by the addition of sodium acetate. Upon completion of the coupling reaction which takes place, the dye compound formed is precipitated by the addition of water, recovered by filtration, washed and dried. The dye compound formed in the example has the formula:

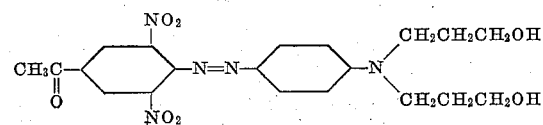

and colors cellulose acetate silk red from an aqueous suspension.

Example 6

20.7 grams of di-β-hydroxyethyl-α-naphthylamine are dissolved in 200 cc. of cold methanol. The diazo solution prepared as described in Example 5 is added with stirring while maintaining the solution in a cold condition. Following the addition of the diazo solution, the mixture resulting is made neutral to Congo red paper by the addition of sodium acetate or sodium carbonate, for example. Upon completion of the coupling reaction, the dye compound formed is precipitated by the addition of water, recovered by filtration, washed and dried. The dye compound has the formula:

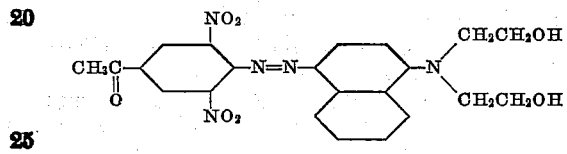

and colors cellulose acetate silk wine from an aqueous suspension.

Example 7

13.7 grams of β-hydroxyethylaniline are dissolved in 100 cc. of glacial acetic acid and the resulting solution is cooled to a temperature approximating 0–10° C. The diazo solution prepared in Example 5 is then added, with stirring, while maintaining a temperature of about 0–10° C. Following its addition, the mixture is allowed to stand for one hour after which it is made neutral to Congo red paper by the addition of sodium acetate. Upon completion of the coupling reaction, the dye compound formed is precipitated with water, recovered by filtration, washed with water and dried. The dye compound formed has the formula:

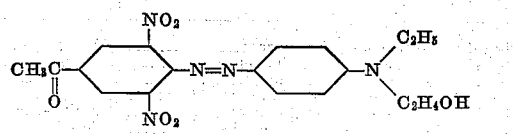

and colors cellulose acetate silk red from an aqueous suspension.

Example 8

25.8 grams of ethyl-3-methoxy-5-bromo-4-amino-phenyl ketone.

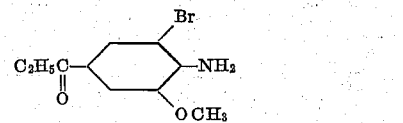

are diazotized in the usual manner and coupled with 17.7 grams of β-hydroxyethylcresidine dissolved in cold dilute hydrochloric acid. The coupling is completed by adding sodium carbonate following which the dye compound is recovered by filtration, washed with water and dried. The dye compound formed has the formula:

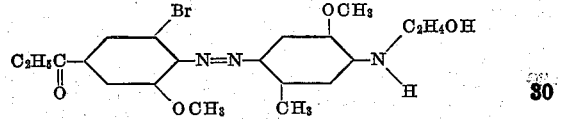

and colors cellulose acetate silk red from an aqueous suspension.

The following tabulation further illustrates the compounds included within the scope of our invention together with the color they produce on cellulose acetate silk. The compounds indicated below may be prepared by diazotizing the amine listed under the heading "Amine" and coupling with the compound specified in the column entitled "Coupling component." The diazotization and coupling reactions may, for example, be carried out following the general procedure described in Examples 1 to 8 inclusive.

| Amine | Coupling component | Color on cellulose acetate silk |
| --- | --- | --- |
| 1-aceto-3,5-diiodo-4-aminobenzene | Barbituric acid | Greenish-yellow. |
| 1-aceto-3-bromo-5-nitro-4-aminobenzene | ----do---- | Do. |
| 1-aceto-3,5-dinitro-4-aminobenzene | ----do---- | Do. |
| 1-aceto-3,5-diiodo-4-aminobenzene | 5,5-dimethyl-1,3-cyclohexadione | Do. |
| 1-aceto-3-bromo-5-nitro-4-aminobenzene | ----do---- | Do. |
| 1-aceto-3,5-dinitro-4-aminobenzene | ----do---- | Do. |
| 1-aceto-3,5-diiodo-4-aminobenzene | p-Cresol | Yellow. |
| 1-aceto-3-bromo-5-nitro-4-aminobenzene | ----do---- | Do. |
| 1-aceto-3,5-dinitro-4-aminobenzene | ----do---- | Do. |
| 1-aceto-3,5-diiodo-4-aminobenzene | 1-amino-2-methoxy-5-methyl benzene | Orange yellow. |
| 1-aceto-3-bromo-5-nitro-4-aminobenzene | ----do---- | Do. |
| 1-aceto-3,5-dinitro-4-aminobenzene | ----do---- | Orange. |
| 1-aceto-3,5-diiodo-4-aminobenzene | β-hydroxyethyl-aniline | Orange-yellow. |
| 1-aceto-3-bromo-5-nitro-4-aminobenzene | ----do---- | Orange. |
| 1-aceto-3,5-dinitro-4-aminobenzene | ----do---- | Orange red. |
| 1-aceto-3,5-diiodo-4-aminobenzene | Di-β-hydroxyethylaniline | Red. |
| 1-aceto-3-bromo-5-nitro-4-aminobenzene | ----do---- | Do. |
| 1-aceto-3,5-dinitro-4-aminobenzene | ----do---- | Do. |
| 1-aceto-3,5-diiodo-4-aminobenzene | Ethyl-β-hydroxyethylaniline | Do. |
| 1-aceto-3-bromo-5-nitro-4-aminobenzene | ----do---- | Do. |
| 1-aceto-3,5-dinitro-4-aminobenzene | ----do---- | Do. |
| 1-aceto-3, 5-diiodo-4-aminobenzene | Di-γ-hydroxypropyl-α-naphthylamine | Do." |
| 1-aceto-3-bromo-5-nitro-4-aminobenzene | ----do---- | Purplish red. |
| 1-aceto-3,5-dinitro-4-aminobenzene | ----do---- | Violet." |
| 1-aceto-3, 5-diiodo-4-aminobenzene | m-Methoxy-di-β-hydroxyethylaniline | Red. |
| 1-aceto-3-bromo-5-nitro-4-aminobenzene | ----do---- | Do. |
| 1-aceto-3,5-dinitro-4-aminobenzene | ----do---- | Do. |
| 1-aceto-3, 5-diiodo-4-aminobenzene | ⌬—N—(CH₂—CHOH—CH₃)₂ | Do. |
| 1-aceto-3-bromo-5-nitro-4-aminobenzene | ⌬—N—(CH₂—CHOH—CH₃)₂ | Do. |
| 1-aceto-3, 5-dinitro-4-aminobenzene | ----do---- | Do. |
| 1-aceto-3, 5-diiodo-4-aminobenzene | Ethyl-β-hydroxy ethyl cresidine | Do. |
| 1-aceto-3-bromo-5-nitro-4-aminobenzene | ----do---- | Do. |
| 1-aceto-3, 5-dinitro-4-aminobenzene | ----do---- | Do. |

| Amine | Coupling component | Color on cellulose acetate silk |
|---|---|---|
| 1-aceto-3,5-diiodo-4-aminobenzene | β-hydroxy ethyl-m-toluidine | Red. |
| 1-aceto-3-bromo-5-nitro-4-aminobenzene | do | Do. |
| 1-aceto-3,5-dinitro-4-aminobenzene | do | Do. |
| Ethyl-3-methyl-5-nitro-4-amino-phenyl ketone | do | Do. |
| 1-aceto-3-chloro-5-nitro-4-aminobenzene | 1-amino-5-naphthol | Blue. |
| Ethyl-3,5-dichloro-4-amino-phenyl ketone | Di-β-hydroxyethyl-aniline | Orange. |
| Ethyl-3,5-dinitro-4-amino-phenyl ketone | do | Red. |
| Ethyl-3-chloro-5-methyl-4-aminophenyl ketone | do | Orange. |
| Ethyl-3-methoxy-5-chloro-4-aminophenyl ketone. | Ethyl-β-hydroxyethylaniline | Do. |
| Ethyl-3-methoxy-5-nitro-4-aminophenyl ketone | do | Red. |
| Ethyl-3,5-dimethyl-4-aminophenyl ketone | 1-amino-2-methoxy-5-methylbenzene | Yellowish-orange. |
| Ethyl-3,5-dimethoxy-4-aminophenyl ketone | β-hydroxyethylaniline | Do. |
| 1-aceto-3,5-dimethoxy-4-aminophenyl ketone | do | Do. |
| 1-aceto-3,5-dimethyl-4-aminophenyl ketone | do | Do. |
| 1-aceto-3-methyl-5-chloro-4-aminophenyl ketone | Barbituric acid | Green-yellow. |
| 1-aceto-3-methyl-5-chloro-4-aminophenyl ketone. | Ethyl-β-hydroxyethylaniline | Orange. |

In order that our invention may be fully understood, the preparation of a number of intermediate substances employed in the manufacture of the dye compounds of our invention is disclosed hereinafter.

Compounds having the general formula:

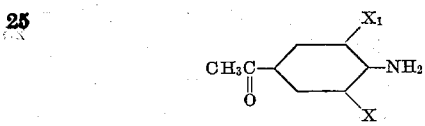

wherein X and $X_1$ each represents a halogen atom may be prepared by halogenation of methyl-3-chloro-4-aminophenylketone, methyl-3-bromo-4-aminophenylketone or methyl-3-iodo-4-aminophenylketone, for example. The preparation of these latter named compounds is indicated herein.

*Preparation of methyl-3-chloro-4-aminophenyl ketone*

This compound may be prepared as described in Journal of the Chemical Society, volume 85, pages 340–341 (1904).

*Preparation of methyl-3-bromo-4-aminophenyl ketone*

Methyl-3-bromo-4-acetylaminophenyl ketone may be prepared as described in The Journal of the American Chemical Society, volume 50, page 158 (1928). This compound may be converted to the hydrochloride of the desired compound upon heating with an aqueous hydrochloric acid solution.

*Preparation of methyl-3-iodo-4-aminophenyl ketone*

This compound may be obtained by preparing para iodo acetanilide as described in Journal of the Chemical Socity, vol. 105, page 125 (1914), and converting it to the desired product by treatment with hot aqueous hydrochloric acid.

Compounds having the general formula:

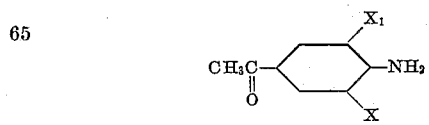

wherein X represents a nitro group and $X_1$ represents a halogen atom may be prepared by halogenation of methyl-3-nitro-4-aminophenylketone which can be prepared as described in Journal of the Chemical Society, page 2403, for the year 1931.

*Preparation of methyl-3,5-dinitro-4-aminophenylketone (1-aceto-3,5-dinitro-4-aminobenzene)*

This compound can be prepared as described in Recueil Travaux Chimique Pays Bas, vol. 34, page 208 (1915).

*Preparation of ethyl-3,5-dinitro-4-aminophenyl ketone*

This compound can be prepared by the method described in Recueil Travaux Chimique Pays Bas, vol. 34, page 208 (1915).

*Preparation of ethyl-1-chloro-5-methyl-4-aminophenylketone*

This compound can be prepared by the method described in Journal of the Chemical Society, vol. 85, pages 340–341 (1904).

*Preparation of methyl-3,5-dimethyl-4-aminophenylketone (1-aceto-3,5-dimethyl-4-aminobenzene)*

This compound may be prepared by the general method of Kunckell Berichte der deutschen chemischen gesellschaft, vol. 33, page 2641 (1900).

16 grams of acetyl chloride and 38 grams of aluminum chloride are placed in a suitable reaction vessel together with 50 cc. of dry carbon disulfide. 16.3 grams of 2,6-dimethyl-acetanilide are dissolved in 200 cc. of carbon disulfide and the resulting mixture is added dropwise to the mixture in the reaction vessel over a period of three hours while maintaining a temperature of 40° C. The reaction mixture resulting is then heated to boiling for three hours and poured onto ice. The solid material precipitating out on cooling is recovered by filtration. This solid material is

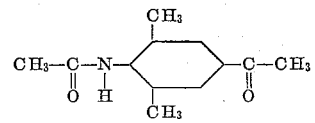

By treatment of it with hydrochloric acid, methyl-3,5-dimethyl-4-aminophenylketone can be obtained in its free amine form.

*Preparation of methyl-3,5-dimethoxy-4-aminophenylketone (1-aceto-3,5-dimethoxy - 4 - aminobenzene)*

This compound may be prepared by the same general method described above in connection with the preparation of methyl-3,5-dimethyl-4-aminophenylketone.

In order that the application of the compounds of our invention may be clearly understood their application for the direct dyeing or coloration of materials made of or containing an organic derivative of cellulose, and more particularly cellulose acetate silk, is described hereinafter. Although the remarks are more particularly directed to the dyeing or coloring of the above mentioned materials those pertaining to temperature, the dispersing agents and the amounts of dispersing agent and dye which may be employed, for example, are of general applicability where the dye is to be applied directly to the fiber from an aqueous suspension. The general methods by which the dye compounds may be applied to the coloration of other materials are well known in the art and need not be described here.

In employing the aromatic azo derivatives of our invention as dyes, they will ordinarily be applied to the material in the form of an aqueous suspension which can be prepared by grinding the dye to a paste in the presence of a sulfonated oil, soap, or other suitable dispersing agent and dispersing the resulting paste in water. Dyeing operations can, with advantage, be conducted at a temperature of 80-85° C., but any suitable temperature may be used. In accordance with the usual dyeing practice, the material to be dyed will ordinarily be added to the aqueous dye bath at a temperature lower than that at which the main portion of the dyeing is to be effected, a temperature approximating 45-55° C., for example, following which the temperature of the dye bath will be raised to that selected for carrying out the dyeing operation. The temperature at which the dyeing is conducted will vary somewhat, depending, for example, on the particular material or materials undergoing colorations.

The amount of dispersing agent employed may be varied over wide limits. Amounts approximating 10 to 200% by weight on the dye may be employed, for example. These amounts are not to be taken as limits as greater or lesser amounts can be used. To illustrate, if the dye is ground to a sufficiently fine powder, dyeing can be satisfactorily carried out without the aid of a dispersing agent. Generally speaking, however, the use of a dispersing agent is desirable.

Advantageously, dyeing is carried out in a substantially neutral dyebath. Perhaps, more accurately, it should be stated that dyeing should not be carried out in an alkaline dyebath, that is, one having any substantial alkalinity, since the presence of free alkali appears to affect the dyeing adversely. Dyeing in an acid dyebath is not recommended because of the tendency of acids to affect the material undergoing dyeing adversely. Because of these considerations when a dispersing agent is to be employed preferably it is neutral or substantially neutral.

It will be understood that the azo compounds of our invention may be applied to the material to be colored in any suitable manner. Coloration may be effected, for example, by dyeing, printing, or stenciling. Dispersing or solubilizing agents that can be employed for preparing suspensions of the dye include soap, sulphoricinoleic acid, salts of sulphoricinoleic acid, a water soluble salt of cellulose phthalate, cellulose succinate or cellulose mono-acetate diphthalate, for example, the sodium, potassium or ammonium salts, and sulfonated oleic, stearic or palmitic acid, or salts thereof, such, for example, as the sodium or ammonium salts.

While it is preferred to effect coloration by applying the dye compound from an aqueous dyebath directly to the material to be colored, the azo compounds of our invention may be applied employing the methods applicable to the so-called ice colors. Briefly, in accordance with this method of dyeing, the amine is absorbed and diazotized on the fiber after which the dye is formed in situ by developing with a coupling component such as 5-methyl-1,3-cyclohexadione or ethyl-β-hydroxyethylaniline, for example. Conversely, the material undergoing dyeing or coloration may first be treated to absorb one of said coupling components and the dye subsequently formed in situ by coupling with a diazonium salt of the benzene or naphthalene series.

The following examples illustrate how dyeing may be carried out in accordance with our invention. Quantities are expressed in parts by weight.

*Example A*

2.5 parts of

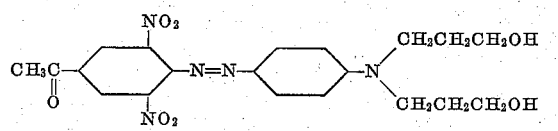

are finely ground with a dispersing agent such as soap or oleyl glyceryl sulfate and the resulting paste is dispersed in 1000 parts of water. The dispersion thus prepared is heated to a temperature approximating 45–55° C. and 100 parts of cellulose acetate silk in the form of yarn or fabric, for example, are added to the dyebath after which the temperature is gradually raised to 80–85° C. and the silk worked for several hours at this latter temperature. Sodium chloride may be added if desired during the dyeing operation to promote exhaustion of the dyebath. Upon completion of the dyeing operation, the cellulose acetate silk is removed, washed with soap, rinsed, and dried. The cellulose acetate silk is colored a reddish shade of good fastness to light.

*Example B*

By the substitution of 2.5 parts of

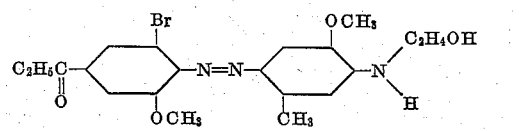

for dye compound of Example A, cellulose acetate silk can likewise be dyed a reddish shade of excellent light fastness in an exactly similar manner as described in said example.

While our invention has been illustrated in connection with the dyeing of cellulose acetate silk, it will be understood that dyeing operations can be carried out in a manner similar to that described above by the substitution of another organic derivative of cellulose material for cellulose acetate silk or by employing dye compounds other than those employed in the examples or by substitution of both the material being dyed and the dye compounds of the examples.

We claim:
1. An azo dye having the general formula:

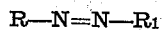

wherein R represents the residue of a phenylalkyl ketone, the phenyl nucleus of which contains two substituents selected from the group consisting of a univalent aliphatic radical, a nitro group and a halogen atom and wherein $R_1$ represents a member selected from the group consisting of an aryl nucleus of the benzene and naphthalene series, a hydroaromatic nucleus and a heterocyclic nucleus.

2. An azo dye having the general formula:

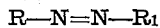

wherein R represents the residue of a phenyl-alkyl ketone, the phenyl nucleus of which contains two substituents selected from the group consisting of a univalent aliphatic radical, a nitro group and a halogen atom and wherein $R_1$ represents an aryl nucleus of the benzene series.

3. An azo dye having the general formula:

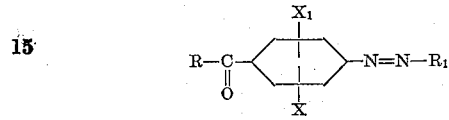

where R represents an alkyl group, X and $X_1$ each represent a member selected from the group consisting of a univalent aliphatic radical, a nitro group and a halogen atom and $R_1$ represents a member selected from the group consisting of an aryl group of the benzene and naphthalene series, a hydroaromatic nucleus and a heterocyclic nucleus.

4. An azo dye having the general formula:

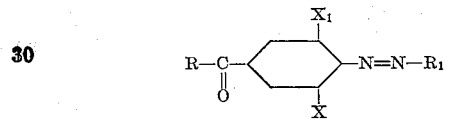

wherein R represents an alkyl group, X and $X_1$ each represent a member selected from the group consisting of a univalent aliphatic radical, a nitro group and a halogen atom and $R_1$ represents a member selected from the group consisting of an aryl group of the benzene and naphthalene series, a hydroaromatic nucleus and a heterocyclic nucleus.

5. An azo dye having the general formula:

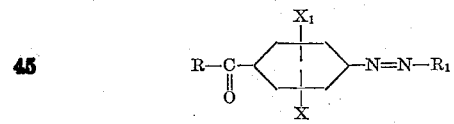

wherein R represents an alkyl group, X and $X_1$ each represent a member selected from the group consisting of a univalent aliphatic radical, a nitro group and a halogen atom and $R_1$ represents an aryl nucleus of the benzene series.

6. An azo dye having the general formula:

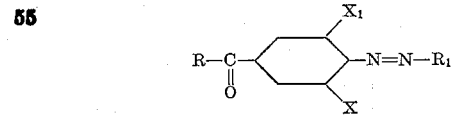

wherein R represents an alkyl group, X and $X_1$ each represent a member selected from the group consisting of a univalent aliphatic radical, a nitro group and a halogen atom and $R_1$ represents an aryl nucleus of the benzene series.

7. An azo dye having the general formula:

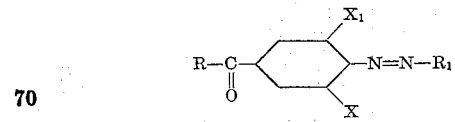

wherein R represents an alkyl group, X and $X_1$ each represent a member selected from the group consisting of a univalent aliphatic radical, a nitro group and a halogen atom and $R_1$ represents a nuclear non-sulfonated aryl nucleus of the benzene series.

8. An azo dye having the general formula:

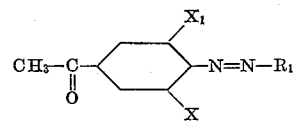

wherein X and $X_1$ each represent a member selected from the group consisting of a univalent aliphatic radical, a nitro group and a halogen atom and $R_1$ represents an aryl nucleus of the benzene series.

9. The azo compound having the formula:

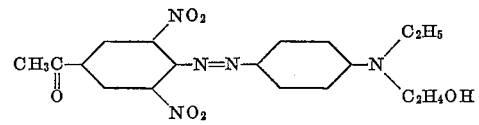

10. The azo compound having the formula:

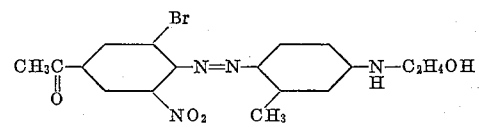

11. The azo compound having the formula:

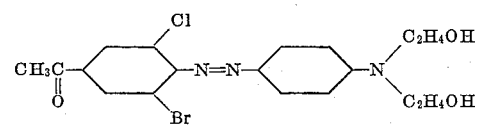

12. Material made of or containing an organic derivative of cellulose colored with a dye, having affinity for organic derivatives of cellulose, selected from the class of azo compounds having the general formula:

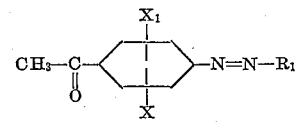

wherein R represents an alkyl group, X and $X_1$ each represent a member selected from the group consisting of a univalent aliphatic radical, a nitro group and a halogen atom and $R_1$ represents a nuclear non-sulfonated member selected from the group consisting of an aryl group of the benzene and naphthalene series, a hydroaromatic nucleus and a heterocyclic nucleus.

13. Material made of or containing an organic acid ester of cellulose colored with a dye, having affinity for organic acid esters of cellulose, selected from the class of azo compounds having the general formula:

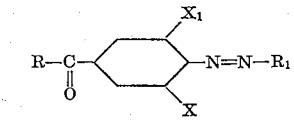

wherein R represents an alkyl group, X and $X_1$ each represent a member selected from the group consisting of a univalent aliphatic radical, a nitro group and a halogen atom and $R_1$ represents a nuclear non-sulfonated member selected from the group consisting of an aryl group of the benzene and naphthalene series, a hydroaromatic nucleus and a heterocyclic nucleus.

14. A cellulose acetate colored with a dye, having affinity for cellulose acetate, selected from the class of azo compounds having the general formula:

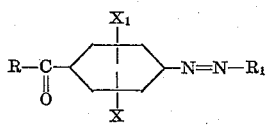

wherein R represents an alkyl group, X and $X_1$ each represent a member selected from the group consisting of a univalent aliphatic radical, a nitro group and a halogen atom and $R_1$ represents a nuclear non-sulfonated member selected from the group consisting of an aryl group of the benzene and naphthalene series, a hydroaromatic nucleus and a heterocyclic nucleus.

15. A cellulose acetate colored with a dye, having affinity for cellulose acetate, selected from the class of azo compounds having the general formula:

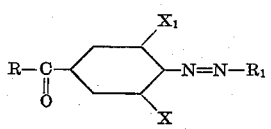

wherein R represents an alkyl group, X and $X_1$ each represent a member selected from the group consisting of a univalent aliphatic radical, a nitro group and a halogen atom and $R_1$ represents a nuclear non-sulfonated aryl nucleus of the benzene series.

16. A cellulose acetate colored with a dye, having affinity for cellulose acetate, selected from the class of azo compounds having the general formula:

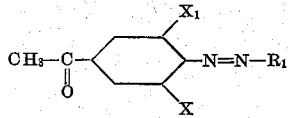

wherein X and $X_1$ each represent a member selected from the group consisting of a univalent aliphatic radical, a nitro group and a halogen atom and $R_1$ represents a nuclear non-sulfonated aryl nucleus of the benzene series.

JAMES G. McNALLY.
JOSEPH B. DICKEY.